United States Patent
Ota

(10) Patent No.: US 10,674,126 B2
(45) Date of Patent: Jun. 2, 2020

(54) PROJECTOR AND METHOD FOR CONTROLLING PROJECTOR

(71) Applicant: SEIKO EPSON CORPORATION, Tokyo (JP)

(72) Inventor: Susumu Ota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/914,029

(22) Filed: Mar. 7, 2018

(65) Prior Publication Data
US 2018/0270458 A1 Sep. 20, 2018

(30) Foreign Application Priority Data
Mar. 17, 2017 (JP) .................................. 2017-052345

(51) Int. Cl.
*H04N 9/31* (2006.01)
*H04N 5/445* (2011.01)

(52) U.S. Cl.
CPC .......... *H04N 9/3185* (2013.01); *H04N 5/445* (2013.01)

(58) Field of Classification Search
CPC combination set(s) only.
See application file for complete search history.

(56) References Cited

U.S. PATENT DOCUMENTS

| | | | |
|---|---|---|---|
| 4,706,115 A * | 11/1987 | Colineau | H04N 3/22 315/368.18 |
| 6,540,365 B1 | 4/2003 | Fujiwara et al. | |
| 7,093,940 B2 * | 8/2006 | Kubo | H04N 5/74 345/647 |
| 7,206,029 B2 * | 4/2007 | Cohen-Solal | H04N 5/45 345/629 |
| 7,982,810 B2 * | 7/2011 | Ohara | H04N 5/44504 348/563 |
| 8,403,500 B2 * | 3/2013 | Todoroki | H04N 9/3185 348/335 |
| 8,866,976 B1 * | 10/2014 | Ozawa | H04N 9/3194 348/744 |
| 8,985,781 B2 * | 3/2015 | Sakai | H04N 9/3185 353/30 |
| 9,122,138 B2 * | 9/2015 | Furui | G03B 21/147 |
| 9,224,322 B2 * | 12/2015 | Martellaro | G09G 3/003 |
| 9,291,882 B2 * | 3/2016 | Funada | G03B 5/02 |
| 9,319,651 B2 * | 4/2016 | Watanabe | H04N 9/3185 |

(Continued)

FOREIGN PATENT DOCUMENTS

| | | |
|---|---|---|
| JP | 4252671 B2 | 4/2009 |
| JP | 2009-216815 A | 9/2009 |
| JP | 2013-137368 A | 7/2013 |

*Primary Examiner* — Brian P Yenke
(74) *Attorney, Agent, or Firm* — Oliff PLC

(57) ABSTRACT

A projector includes a first corrector that performs first correction that corrects distortion of an image on first image information to generate first corrected image information, a second corrector that performs second correction that corrects distortion of an image on second image information to generate second corrected image information, a combiner that combines the first corrected image information and the second corrected image information with each other to generate combined image information, and a projection section that projects an image according to the combined image information. The second correction differs from the first correction.

7 Claims, 8 Drawing Sheets

(56) References Cited

U.S. PATENT DOCUMENTS

| | | | |
|---|---|---|---|
| 9,348,212 B2* | 5/2016 | Ishikawa | G03B 41/00 |
| 9,490,853 B2* | 11/2016 | Kwak | H03H 7/38 |
| 9,514,716 B2* | 12/2016 | Shinozaki | G09G 5/37 |
| 10,048,905 B2* | 8/2018 | Imai | G06F 3/0488 |
| 2002/0051095 A1* | 5/2002 | Su | H04N 5/74 348/745 |
| 2002/0140862 A1* | 10/2002 | Dimitrova | H04N 5/45 348/565 |
| 2003/0095239 A1* | 5/2003 | Hirao | H04N 5/44504 353/69 |
| 2004/0227911 A1* | 11/2004 | Salvatori | H04N 5/74 353/122 |
| 2005/0237492 A1* | 10/2005 | Shinozaki | H04N 5/74 353/69 |
| 2009/0225235 A1* | 9/2009 | Fujisaki | H04N 7/0122 348/745 |
| 2011/0069234 A1* | 3/2011 | Kaise | H04N 5/44513 348/607 |
| 2011/0157563 A1* | 6/2011 | Funada | G03B 5/02 353/70 |
| 2011/0181846 A1* | 7/2011 | Ozawa | G03B 21/14 353/70 |
| 2012/0062855 A1* | 3/2012 | Todoroki | H04N 9/3185 353/69 |
| 2012/0257173 A1* | 10/2012 | Murayama | G06T 3/40 353/69 |
| 2013/0009966 A1* | 1/2013 | Koyama | H04N 19/12 345/501 |
| 2013/0021585 A1* | 1/2013 | Tamura | G09G 5/00 353/69 |
| 2013/0169671 A1* | 7/2013 | Iwahara | G06T 11/60 345/619 |
| 2013/0222776 A1* | 8/2013 | Ishikawa | H04N 9/3185 353/121 |
| 2013/0335643 A1* | 12/2013 | Ishida | H04N 9/3155 348/744 |
| 2014/0022463 A1* | 1/2014 | Kinebuchi | H04N 9/31 348/759 |
| 2014/0104582 A1* | 4/2014 | Mori | H04N 9/3185 353/30 |
| 2015/0015583 A1* | 1/2015 | Watanabe | G06F 3/0482 345/428 |
| 2015/0022554 A1* | 1/2015 | Nobori | H04N 9/3155 345/634 |
| 2015/0049117 A1* | 2/2015 | Furui | H04N 9/3185 345/634 |
| 2015/0092166 A1* | 4/2015 | Jurik | H04N 9/3185 353/70 |
| 2015/0138513 A1* | 5/2015 | Ichieda | H04N 9/3185 353/70 |
| 2015/0234262 A1* | 8/2015 | Yoshimura | G03B 21/147 353/69 |
| 2015/0312515 A1* | 10/2015 | Rivera | G03B 21/00 348/745 |
| 2015/0338724 A1* | 11/2015 | Tsukagoshi | G03B 21/147 353/69 |
| 2016/0018905 A1* | 1/2016 | Nagao | G06F 3/033 345/157 |
| 2016/0025327 A1* | 1/2016 | Abe | G03B 21/204 348/744 |
| 2016/0094821 A1* | 3/2016 | Mori | H04N 9/3185 348/745 |
| 2016/0227180 A1* | 8/2016 | Ishii | H04N 9/3185 |
| 2016/0247321 A1* | 8/2016 | Wong | G06F 3/017 |
| 2016/0261836 A1* | 9/2016 | Saigo | H04N 9/3185 |
| 2016/0295184 A1* | 10/2016 | Ishikawa | H04N 9/3185 |
| 2016/0381333 A1* | 12/2016 | Yoshida | H04N 9/3194 348/746 |
| 2017/0127031 A1* | 5/2017 | Mori | G06T 3/0093 |
| 2017/0142382 A1* | 5/2017 | Nishioka | G06F 3/0488 |
| 2017/0208304 A1* | 7/2017 | Furui | H04N 9/3185 |
| 2017/0214895 A1* | 7/2017 | Fujioka | H04N 9/3188 |
| 2017/0257608 A1* | 9/2017 | Ikeda | G06T 11/60 |
| 2018/0220510 A1* | 8/2018 | Miichi | H05B 37/02 |
| 2019/0043444 A1* | 2/2019 | Yasuda | G09G 5/026 |
| 2019/0066552 A1* | 2/2019 | Takagi | H04N 9/3185 |

* cited by examiner

PROJECTOR AND METHOD FOR CONTROLLING PROJECTOR

CROSS-REFERENCE

The entire disclosure of Japanese Patent Application No. 2017-052345, filed Mar. 17, 2017 is expressly incorporated by reference herein.

BACKGROUND

1. Technical Field

The present invention relates to a projector and a method for controlling the projector.

2. Related Art

Japanese Patent No. 4,252,671 describes a projector that combines two images on each of which trapezoidal distortion correction has been performed with each other to generate a combined image and projects the combined image on a screen. The projector uses an OSD menu and an image for projection as the two images to be combined with each other and performs the same trapezoidal distortion correction on the OSD menu and the image for projection.

The projector described in Japanese Patent No. 4,252,671 can be used as an illumination apparatus, for example, when an image for illumination (single-color image, for example) is used as the image for projection.

Even in the situation in which the projector is used as an illumination apparatus, an image that requires viewability, such as the OSD menu, needs to undergo trapezoidal distortion correction for ensuring the viewability. On the other hand, the image for illumination does not need to undergo strict trapezoidal distortion correction for ensuring the viewability but needs to undergo trapezoidal distortion correction for causing the area where the image for illumination is projected to match with an illumination target area (area where user desires to apply illumination light). That is, in the situation in which the projector is used as an illumination apparatus, different kinds of trapezoidal distortion correction need to be performed on the two images to be combined with each other.

In the projector described in Japanese Patent No. 4,252,671, in which the same trapezoidal distortion correction is performed on the two images to be combined with each other, different kinds of trapezoidal distortion correction cannot be performed on the two images to be combined with each other.

SUMMARY

An advantage of some aspects of the invention is to provide a technology that allows different kinds of trapezoidal distortion correction to be performed on two images to be combined with each other.

An aspect of a projector according to the invention includes a first corrector that performs first correction that corrects distortion of an image on first image information to generate first corrected image information, a second corrector that performs second correction that corrects distortion of an image on second image information to generate second corrected image information, a combiner that combines the first corrected image information and the second corrected image information with each other to generate combined image information, and a projection section that projects an image according to the combined image information, and the second correction differs from the first correction.

According to the aspect described above, different kinds of trapezoidal distortion correction can be performed on two images to be combined with each other.

It is desirable that the aspect of the projector described above further includes a correction controller that adjusts a difference between the first correction and the second correction in accordance with an action mode of the projector.

According to the aspect described above, the relationship between the different types of trapezoidal distortion correction performed on two images to be combined with each other can be a relationship suitable for the action mode.

In the aspect of the projector described above, it is desirable that the action mode includes a first mode and a second mode, and that the correction controller causes the difference between the second correction and the first correction in the first mode to be greater than the difference in the second mode.

According to the aspect described above, the projector operates in a state suitable as an illumination apparatus than a display apparatus in the first mode and operates in a state suitable as a display apparatus than an illumination apparatus in the second mode.

Another aspect of a projector according to the invention includes a first distortion corrector that performs first correction and third correction that each correct distortion of an image on first image information to generate first distortion corrected image information, a combiner that combines second image information and the first distortion corrected image information with each other to generate first combined image information, a second distortion corrector that performs second correction that corrects distortion of an image on the first combined image information to generate second distortion corrected image information, and a projection section that projects an image according to the second distortion corrected image information. The second correction differs from the first correction, and the third correction is reverse correction that is a reverse of the second correction.

According to the aspect described above, different kinds of trapezoidal distortion correction can be performed on two images to be combined with each other.

It is desirable that the aspect of the projector described above further includes a supplier that supplies the first distortion corrector with the first image information in a case where an action mode of the projector is a first mode and does not supply the first distortion corrector but supplies the combiner with the first image information in a case where the action mode is a second mode, that the combiner generates the first combined image information in the first mode and combines the first image information and the second image information with each other to generate second combined image information in the second mode, that the second distortion corrector generates the second distortion corrected image information in the first mode and performs the second correction on the second combined image information to generate third distortion corrected image information in the second mode, and the projection section projects an image according to the second distortion corrected image information in the first mode and projects an image according to the third distortion corrected image information in the second mode.

According to the aspect described above, the projector operates in a state suitable as an illumination apparatus than a display apparatus in the first mode and operates in a state suitable as a display apparatus than an illumination apparatus in the second mode.

An aspect of a method for controlling a projector according to the invention includes performing first correction that corrects distortion of an image on first image information to generate first corrected image information, performing second correction that corrects distortion of an image on second image information to generate second corrected image information, combining the first corrected image information and the second corrected image information with each other to generate combined image information, and projecting an image according to the combined image information, and the second correction differs from the first correction.

According to the aspect described above, different kinds of trapezoidal distortion correction can be performed on two images to be combined with each other.

Another aspect of a method for controlling a projector according to the invention includes performing first correction and third correction that each correct distortion of an image on first image information to generate first distortion corrected image information, combining second image information and the first distortion corrected image information with each other to generate first combined image information, performing second correction that corrects distortion of an image on the first combined image information to generate second distortion corrected image information, and projecting an image according to the second distortion corrected image information. The second correction differs from the first correction, and the third correction is reverse correction that is a reverse of the second correction.

According to the aspect described above, different kinds of trapezoidal distortion correction can be performed on two images to be combined with each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
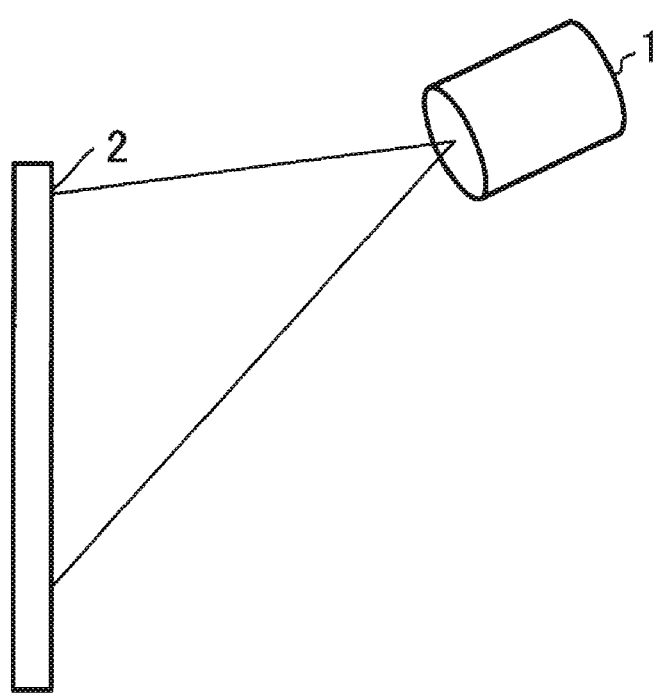
FIG. 1 shows a projector according to a first embodiment to which the invention is applied.

Embodiments according to the invention will be described below with reference to the drawings. In the drawings, the dimension and scale of each portion differ from actual values as appropriate. Further, the embodiments described below are preferable specific examples of the invention. A variety of technically preferable restrictions are therefore imposed on the embodiments. The scope of the invention is, however, not limited to the restricted forms unless otherwise particularly stated in the following description that a restriction is imposed on the invention.

First Embodiment

FIG. 1 shows a projector 1 according to a first embodiment to which the invention is applied. The projector 1 superimposes an OSD image containing characters (letters or numerals, for example) on a background image to generate a combined image and projects the combined image. The projector 1 allows trapezoidal distortion correction to be performed on the background image to differ from trapezoidal distortion correction to be performed on the OSD image.

The projector 1, when it is used as a display apparatus, for example, uses an image showing characters, a person, an animal, a landscape, or any other object (hereinafter also referred to as "image for display") as the background image. The OSD image and the background image (image for display) are both therefore likely to need viewability. In a case where an image containing letters or numerals is used as the background image, in particular, readability and legibility are also required as well as the viewability.

Figure 2:
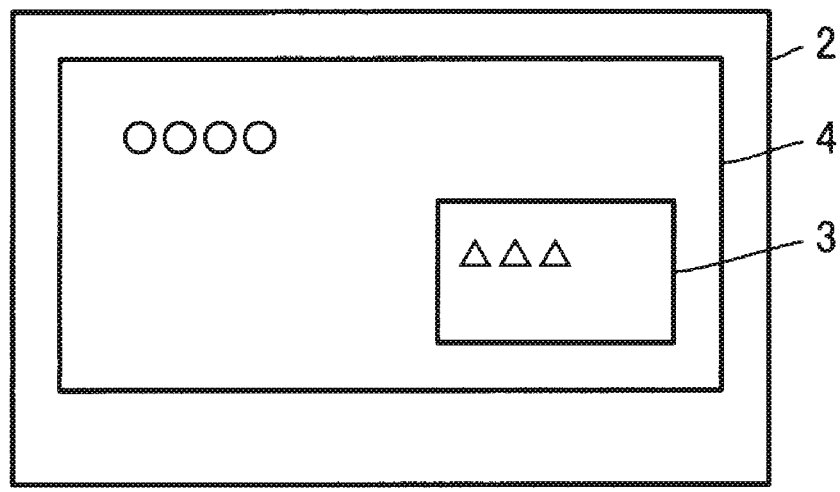
FIG. 2 shows an example in which the same trapezoidal distortion correction is performed on an OSD image and a background image.

In the case where the projector 1 is used as a display apparatus, it is therefore desired that an OSD image 3 and a background image 4, which are displayed on a projection surface 2, such as a wall, are not distorted, as shown in FIG. 2, that is, trapezoidal distortion correction for ensuring viewability is performed on the OSD image 3 and the background image 4.

On the other hand, the projector 1, when it is used as an illumination apparatus, uses, for example, a single-color image or a simply patterned image (hereinafter also referred to as "image for illumination") as the background image. The background image (image for illumination) is therefore unlikely to need viewability.

Figure 3:
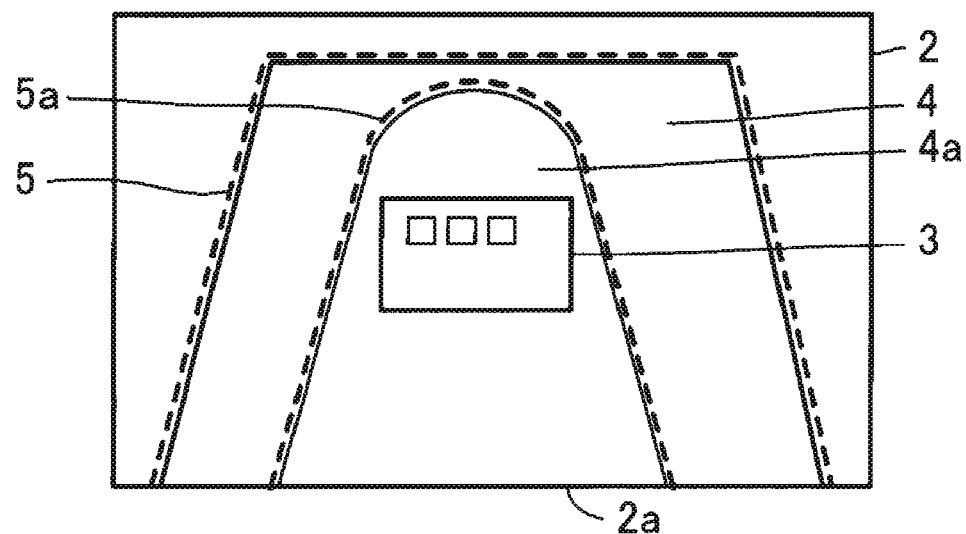
FIG. 3 shows an example in which different kinds of trapezoidal distortion correction are performed on an OSD image and a background image.

In the case where the projector 1 is used as an illumination apparatus, it is therefore desired that the OSD image 3 is not distorted, as shown in FIG. 3, and that the background image (image for illumination) 4 is, rather than not distorted, projected in an illumination target area 5. In addition to the above, it is desired that a specific image portion 4a of the background image 4 (image portion representing spotlight shown in FIG. 3, for example) is projected in a specific area 5a (area irradiated with light from spotlight) in the illumination target area 5.

In a case where the image portion 4a is a single-color image, and the background image 4 is distorted on the projection surface 2, the image portion 4a has a gradation effect (effect of causing image portion 4a to be darker in portion closer to lower end 2a of projection surface 2) in the specific area 5a.

The projector 1, which allows the trapezoidal distortion correction to be performed on the background image to differ from the trapezoidal distortion correction to be performed on the OSD image, can handle both the projection aspect shown in FIG. 2 and the projection aspect shown in FIG. 3.

Figure 4:
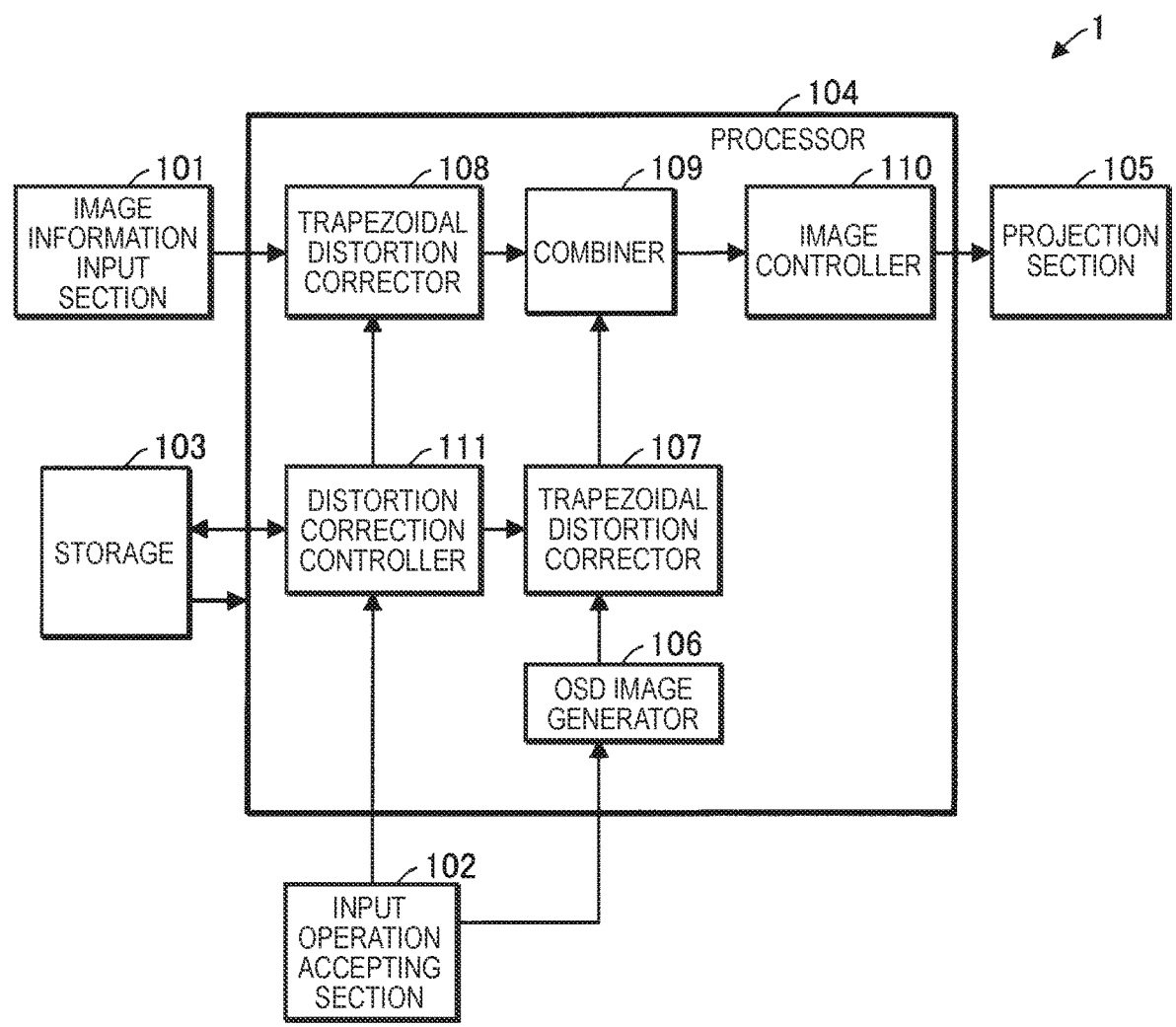
FIG. 4 diagrammatically shows the configuration of the projector.

FIG. 4 diagrammatically shows the projector 1.

The projector 1 has an "illumination mode" and a "display mode" as an action mode. The illumination mode is an example of a first mode, and the display mode is an example of a second mode. The projector 1 includes an image information input section 101, an input operation accepting section 102, a storage 103, a processor 104, and a projection section 105.

The image information input section 101 accepts image information from a processing apparatus, such as a PC (personal computer). The image information represents an image that forms the background of the OSD image. The image information accepted by the image information input section 101 is hereinafter also referred to as "background image information." The image indicated by the background image information is also referred to as a "background image." The background image information is an example of second image information. The processing apparatus that outputs the image information is not limited to a PC and can be changed as appropriate.

The input operation accepting section 102 is formed, for example, of a variety of operation buttons or a touch panel. The input operation accepting section 102 accepts information inputted through a user's input operation (OSD image generation instruction, distortion correction quantity, and action mode switching instruction, for example). The input operation accepting section 102 may, for example, be a remote control that transmits information according to the input operation accepted from the user in a wireless or wired form. In this case, the projector 1 includes a receiver that receives the information transmitted by the remote control. The remote control includes a variety of operation buttons or operation keys or a touch panel that accepts the user's input operation.

The storage 103 is a computer readable recording medium. The storage 103 stores a program that specifies the action of the projector 1 and a variety of pieces of information (for example, image information, action mode information representing action mode, first distortion correction quantity information representing first distortion correction quantity, and second distortion correction quantity information representing second distortion correction quantity).

Figure 5:
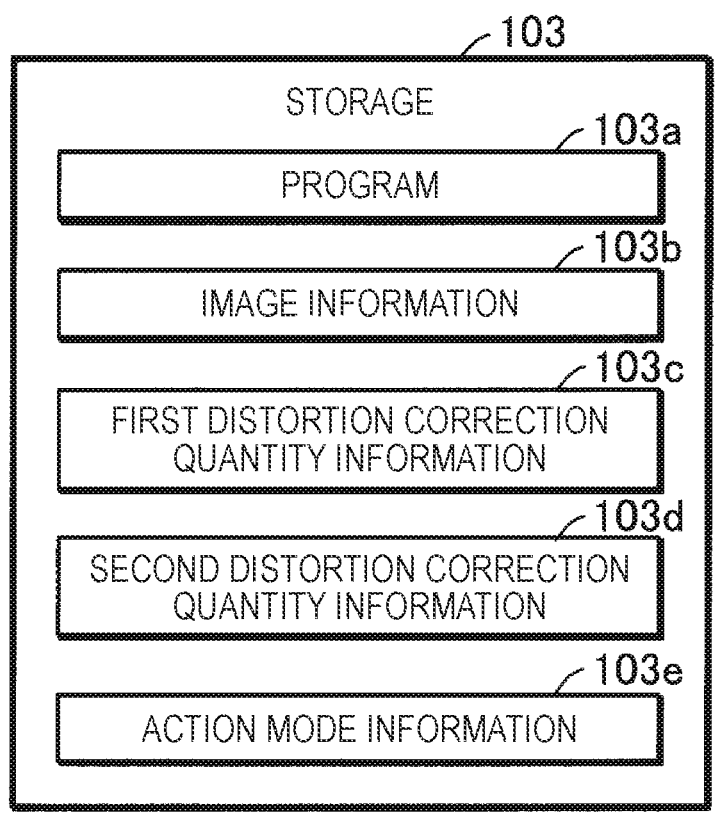
FIG. 5 shows an example of a storage.

FIG. 5 shows an example of the storage 103. In FIG. 5, the storage 103 stores a program 103*a*, image information 103*b*, first distortion correction quantity information 103*c*, second distortion correction quantity information 103*d*, and action mode information 103*e*.

The description with reference to FIG. 4 is resumed. The processor 104 is a computer, such as a CPU (central processing unit). The processor 104 reads and executes the program 103*a* stored in the storage 103 to achieve an OSD image generator 106, trapezoidal distortion correctors 107 and 108, a combiner 109, an image controller 110, and a distortion correction controller 111.

The OSD image generator 106 generates OSD image information representing an OSD image containing characters, such as letters or numerals. The OSD image is a menu screen that displays the states of a variety of adjustment targets (contrast and brightness, for example) of the projector 1. The OSD image may instead be an image different from an image containing characters, such as letters or numerals. The OSD image is desirably an image that needs viewability. The OSD image information is an example of first image information. The OSD image generator 106, when it accepts the OSD image generation instruction via the input operation accepting section 102, generates the OSD image information.

The trapezoidal distortion corrector 107 is an example of a first corrector. The trapezoidal distortion corrector 107 performs trapezoidal distortion correction on the OSD image information to generate first corrected image information. In the following description, the trapezoidal distortion correction performed by the trapezoidal distortion corrector 107 is also referred to as "first correction."

The trapezoidal distortion corrector 108 is an example of a second corrector. The trapezoidal distortion corrector 108 performs trapezoidal distortion correction on the background image information to generate second corrected image information. In the following description, the trapezoidal distortion correction performed by the trapezoidal distortion corrector 108 is also referred to as "second correction." The trapezoidal distortion corrector 108 may perform the second correction on the image information 103*b* stored in the storage 103 to generate the second corrected image information.

The combiner 109 combines the first corrected image information and the second corrected image information with each other to generate combined image information. The combiner 109 superimposes an image indicated by the first corrected image information (OSD image on which first correction has been performed) on an image indicated by the second corrected image information (background image on which second correction has been performed) to generate a combined image and generates image information representing the combined image as the combined image information.

The image controller 110 performs image processing on the combined image information to produce a combined image signal. For example, the image controller 110 performs resolution conversion that allows the resolution of the combined image information to match with the resolution of the projection section 105 to produce the combined image signal.

The projection section 105 projects an image according to the combined image signal on the projection surface 2 (see FIG. 1). The combined image signal corresponds to the combined image information.

Figure 6:
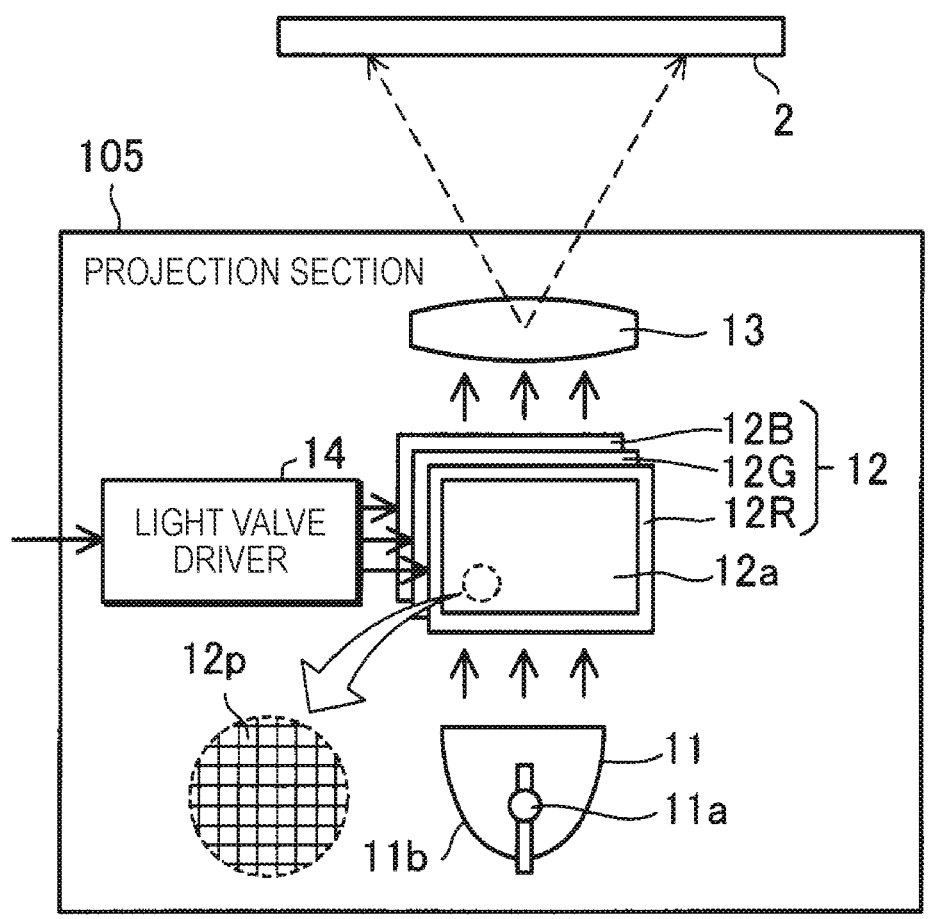
FIG. 6 shows an example of a projection section.

FIG. 6 shows an example of the projection section 105. The projection section 105 includes a light source 11, three liquid crystal light valves 12 (12R, 12G, and 12B), which are each an example of a light modulator, a projection lens 13, which is an example of a projection system, a light valve driver 14, and other components. The projection section 105 modulates light outputted from the light source 11 with the liquid crystal light valves 12 to form a projection image (image light), and the projection lens 13 enlarges and projects the projection image.

The light source 11 includes a light source section 11*a*, which is formed, for example, of an ultrahigh-pressure mercury lamp, an LED (light emitting diode), or a laser light source, and a reflector 11*b*, which reduces the amount of variation in the direction of the light radiated by the light source section 11*a*. The light outputted from the light source 11 passes through an optical integration system that is not shown, where variation in the luminance distribution of the light is reduced, and is separated by a color separation system that is not shown into color light components, red (R), green (G), and blue (B), which are the three primary colors of light. The R, G, and B color light components are incident on the liquid crystal light valves 12R, 12G, and 12B, respectively.

The liquid crystal light valves 12 are each formed, for example, of a liquid crystal panel in which a liquid crystal material is encapsulated between a pair of transparent substrates. The liquid crystal light valves 12 each have a rectangular pixel area 12*a*, which is formed of plurality of pixels 12*p* arranged in a matrix, and drive voltage is applicable to the liquid crystal material for each of the pixels 12*p*. When the light valve driver 14 applies drive voltage according to the combined image signal inputted from the image controller 110 to each of the pixels 12p, light transmittance according to the combined image signal is set in each of the pixels 12p. The light outputted from the light source 11 is therefore modulated when passing through the pixel areas 12a, whereby an image according to the combined image signal is formed on a color light basis.

The color images are combined with one another by a light combining system that is not shown for each of the pixels 12p to generate a projection image that is a color image (color image light). The projection image is enlarged and projected by the projection lens 13 on the projection surface 2.

Referring back to FIG. 4, the distortion correction controller 111 controls the first correction (trapezoidal distortion correction performed by trapezoidal distortion corrector 107) and the second correction (trapezoidal distortion correction performed by trapezoidal distortion corrector 108).

The distortion correction controller 111, when it accepts the first distortion correction quantity information 103c from the input operation accepting section 102, stores the first distortion correction quantity information 103c in the storage 103. The first distortion correction quantity indicated by the first distortion correction quantity information 103c is the distortion correction quantity for reducing the distortion of the image projected on the projection surface 2.

The distortion correction controller 111, when it accepts the second distortion correction quantity information 103d from the input operation accepting section 102, stores the second distortion correction quantity information 103d in the storage 103. The second distortion correction quantity indicated by the second distortion correction quantity information 103d is the distortion correction quantity for adjustment that allows the background image 4 (see FIG. 3) projected on the projection surface 2 to match with the illumination target area 5. The second distortion correction quantity information 103d differs from the first distortion correction quantity information 103c. The trapezoidal distortion correction according to the second distortion correction quantity information 103d therefore differs from the trapezoidal distortion correction according to the first distortion correction quantity information 103c.

The distortion correction controller 111, when it accepts the action mode switching instruction from the input operation accepting section 102, updates the action mode information 103e stored in the storage 103 to switch the action mode from one to the other. For example, the distortion correction controller 111, when it accepts the action mode switching instruction in a situation in which the action mode information 103e indicates the illumination mode, switches the action mode indicated by the action mode information 103e from the illumination mode to the display mode.

The distortion correction controller 111 uses the first distortion correction quantity information 103c and the second distortion correction quantity information 103d to control the first correction and the second correction. The distortion correction controller 111 uses the first distortion correction quantity information 103c and the second distortion correction quantity information 103d to adjust the difference between the first correction and the second correction in accordance with the action mode of the projector 1. For example, the distortion correction controller 111 causes the difference between the first correction and the second correction in the illumination mode to be greater than the difference between the first correction and the second correction in the display mode.

The action of the projector 1 will next be described. It is assumed in the following description that the input operation accepting section 102 has accepted the OSD image generation instruction and the OSD image generator 106 has generated the OSD image information. It is further assumed that the image information input section 101 accepts display image information representing an image for display in the display mode and accepts illumination image information representing an image for illumination in the illumination mode.

Figure 7:
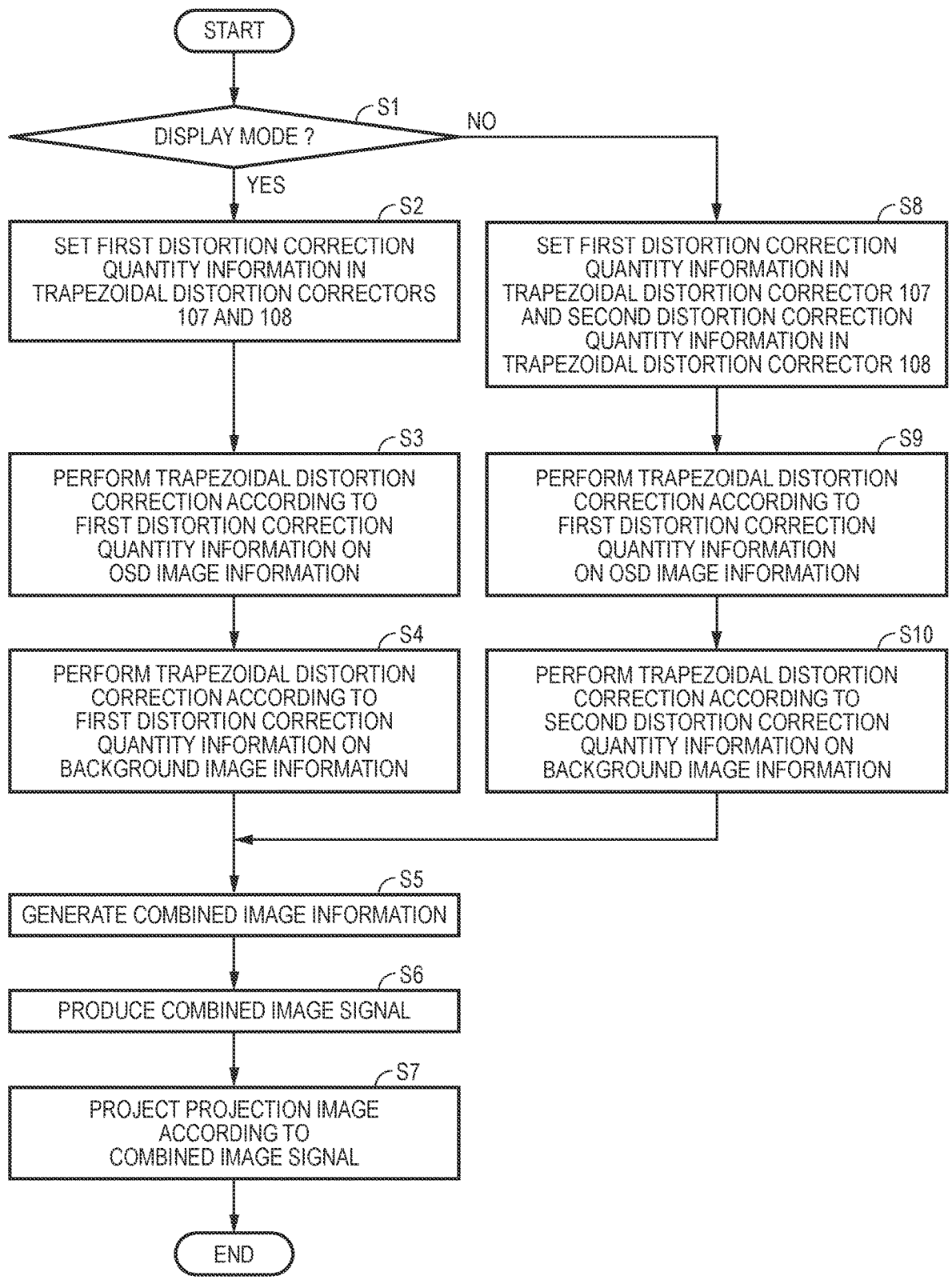
FIG. 7 is a flowchart for describing the action of the projector.

FIG. 7 is a flowchart for describing the action of the projector 1.

In the case where the action mode information 103e indicates the display mode (YES in step S1), the distortion correction controller 111 reads the first distortion correction quantity information 103c from the storage 103. The distortion correction controller 111 subsequently sets the first distortion correction quantity information 103c in the trapezoidal distortion correctors 107 and 108 (step S2).

The trapezoidal distortion corrector 107, when the first distortion correction quantity information 103c is set therein, performs the trapezoidal distortion correction according to the first distortion correction quantity information 103c on the OSD image information to generate the first corrected image information (step S3).

The trapezoidal distortion corrector 108, when the first distortion correction quantity information 103c is set therein, performs the trapezoidal distortion correction according to the first distortion correction quantity information 103c on the background image information (display image information) to generate the second corrected image information (step S4).

The order in accordance with which step S3 and step S4 are carried out may be reversed. In a case where the trapezoidal distortion correctors 107 and 108 are each formed of hardware, such as a circuit, the steps S3 and S4 may be simultaneously carried out.

The combiner 109 subsequently superimposes an image indicated by the first corrected image information on an image indicated by the second corrected image information to generate a combined image and generates combined image information representing the combined image (step S5). The image controller 110 subsequently performs image processing on the combined image information to produce a combined image signal (step S6). The projection section 105 subsequently projects an image according to the combined image signal on the projection surface 2 (step S7).

In the display mode, in which the first distortion correction quantity information 103c is set in the trapezoidal distortion correctors 107 and 108, trapezoidal distortion correction for ensuring viewability (distortion correction that reduces distortion of image projected on projection surface 2) is performed on the OSD image and the background image. The distortion-free OSD image 3 and the background image (image for display) 4 are therefore displayed on the projection surface 2, as shown, for example, in FIG. 2.

On the other hand, in the case where the action mode information 103e indicates the illumination mode (NO in step S1), the distortion correction controller 111 reads the first distortion correction quantity information 103c and the second distortion correction quantity information 103d from the storage 103. The distortion correction controller 111 subsequently sets the first distortion correction quantity information 103c in the trapezoidal distortion corrector 107 and sets the second distortion correction quantity information 103d in the trapezoidal distortion corrector 108 (step S8).

The trapezoidal distortion corrector 107, when the first distortion correction quantity information 103*c* is set therein, performs the trapezoidal distortion correction according to the first distortion correction quantity information 103*c* on the OSD image information to generate the first corrected image information (step S9).

The trapezoidal distortion corrector 108, when the second distortion correction quantity information 103*d* is set therein, performs the trapezoidal distortion correction according to the second distortion correction quantity information 103*d* on the background image information (illumination image information) to generate the second corrected image information (step S10). The order in accordance with which step S9 and step S10 are carried out may be reversed. In the case where the trapezoidal distortion correctors 107 and 108 are each formed of hardware, such as a circuit, the steps S9 and S10 may be simultaneously carried out. Steps S5 to S7 are then carried out.

In the illumination mode, the first distortion correction quantity information 103*c* is set in the trapezoidal distortion corrector 107, and the second distortion correction quantity information 103*d* is set in the trapezoidal distortion corrector 108. Trapezoidal distortion correction for ensuring viewability (distortion correction that reduces distortion of image projected on projection surface 2) is therefore performed on the OSD image, and distortion correction that causes the image projected on the projection surface 2 to match with the illumination target area 5 is performed on the background image. The distortion-free OSD image 3 and the background image (image for illumination) 4 that matches with the illumination target area 5 are therefore displayed on the projection surface 2, as shown, for example, in FIG. 3.

The projector 1 and the method for controlling the projector 1 according to the present embodiment allow different kinds of trapezoidal distortion correction to be performed on two images to be combined with each other (background image and OSD image). Therefore, even in the case where the projector 1 is used as an illumination apparatus, the illumination target area can be illuminated while an OSD image having a small amount of distortion is displayed.

The trapezoidal distortion correction performed on an OSD image uses the first distortion correction quantity information 103*c* irrespective of the action mode. On the other hand, the trapezoidal distortion correction performed on a background image uses the first distortion correction quantity information 103*c* in the display mode and the second distortion correction quantity information 103*d* in the illumination mode. This means that the distortion correction controller 111 causes the difference between the first correction and the second correction in the illumination mode to be greater than the difference between the first correction and the second correction in the display mode.

According to the present embodiment, the change in the type of the trapezoidal distortion correction can be controlled in accordance with the type of the background image (either image for display containing characters or image for illumination containing no characters, for example).

When the action mode is switched from the display mode to the illumination mode, the trapezoidal distortion corrector 108 switches the correction to be performed on the background image information from the correction using the first distortion correction quantity information 103*c* to the correction using the second distortion correction quantity information 103*d*.

On the other hand, when the action mode is switched from the illumination mode to the display mode, the trapezoidal distortion corrector 108 switches the correction to be performed on the background image information from the correction using the second distortion correction quantity information 103*d* to the correction using the first distortion correction quantity information 103*c*, which has already been set in the trapezoidal distortion corrector 107.

Even when the action mode is switched from one to the other, the trapezoidal distortion corrector 107 maintains the correction using the first distortion correction quantity information 103*c*.

Second Embodiment

Figure 8:
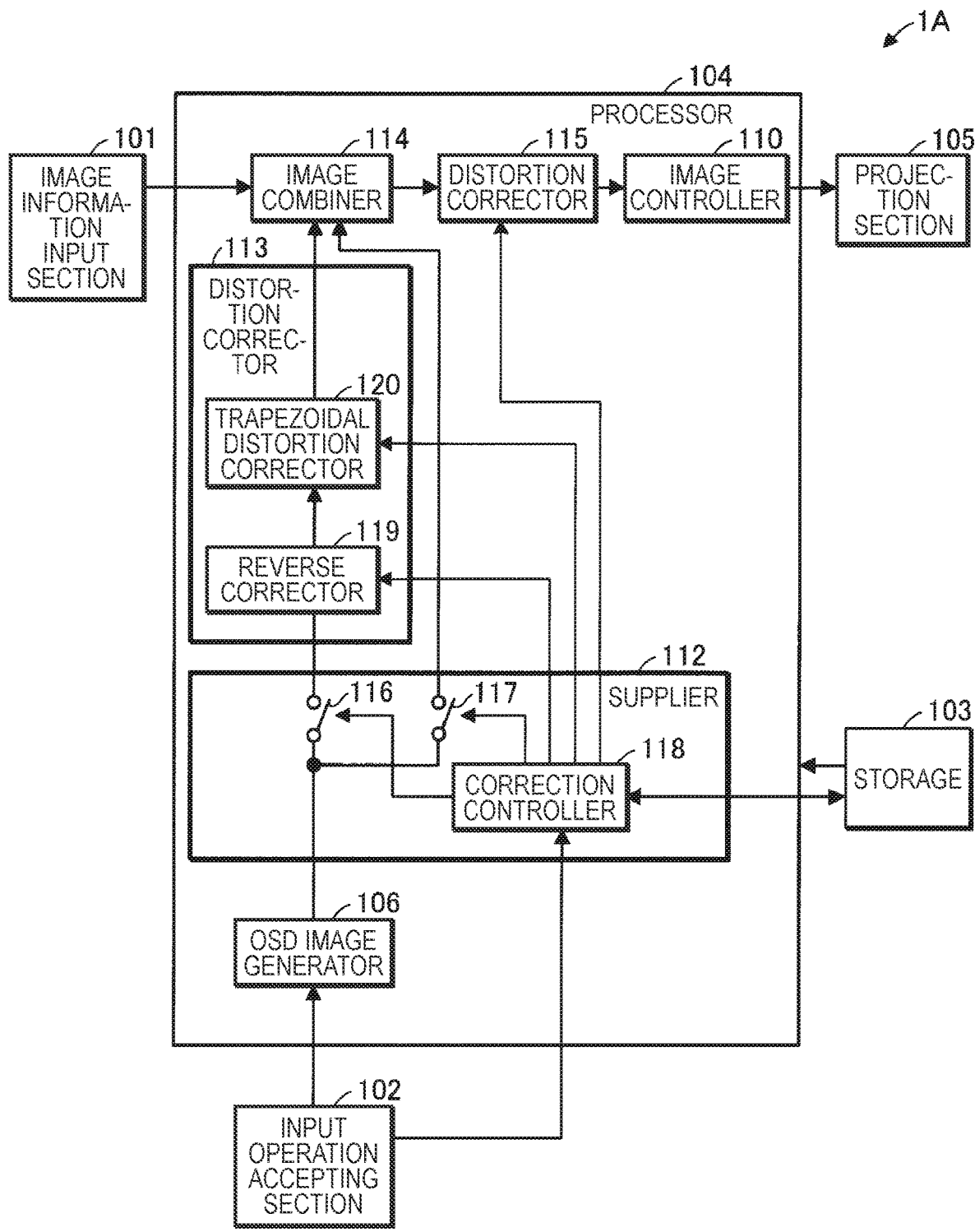
FIG. 8 shows a projector according to a second embodiment to which the invention is applied.

FIG. 8 diagrammatically shows a projector 1A according to a second embodiment to which the invention is applied. The projector 1A has the "display mode" and the "illumination mode" as the action mode, is used as a display apparatus and an illumination apparatus, and superimposes an OSD image on a background image to generate a combined image and projects the combined image, as in the case of the projector 1.

The projector 1A differs from the projector 1 in terms of the program stored in the storage 103 so that the functional portions achieved when the processor 104 executes the program differ and further differs in that the storage 103 further stores third distortion correction quantity information used in reverse correction that is the reverse of the trapezoidal distortion correction according to the second distortion correction quantity information 103*d*. The projector 1A will be described below primarily about the points that make the projector 1A differ from the projector 1.

In the projector 1A, the processor 104 executes the program stored in the storage 103 to achieve the OSD image generator 106, the image controller 110, a supplier 112, a distortion corrector 113, an image combiner 114, and a distortion corrector 115. The supplier 112 includes switches 116 and 117 and a correction controller 118. The distortion corrector 113 includes a reverse corrector 119 and a trapezoidal distortion corrector 120.

The supplier 112 does not supply the image combiner 114 but supplies the distortion corrector 113 with the OSD image information in the illumination mode. On the other hand, the supplier 112 does not supply the distortion corrector 113 but supplies the image combiner 114 with the OSD image information in the display mode.

The switch 116 is provided between the OSD image generator 106 and the distortion corrector 113. The switch 117 is provided between the OSD image generator 106 and the image combiner 114.

The correction controller 118 turns on the switch 116 but turns off the switch 117 in the illumination mode and turns off the switch 116 but turns on the switch 117 in the display mode. The correction controller 118 reads the first distortion correction quantity information 103*c*, the second distortion correction quantity information 103*d*, and the third distortion correction quantity information from the storage 103, sets the first distortion correction quantity information 103*c* in the trapezoidal distortion corrector 120, sets the second distortion correction quantity information 103*d* in the distortion corrector 115, and sets the third distortion correction quantity information in the reverse corrector 119.

The distortion corrector 113 is an example of a first distortion corrector. The distortion corrector 113 performs the trapezoidal distortion correction according to the first distortion correction quantity information 103*c* and trapezoidal distortion correction according to the third distortion correction quantity information on the OSD image information in the illumination mode.

The reverse corrector 119 performs the trapezoidal distortion correction according to the third distortion correction quantity information on the OSD image information. The trapezoidal distortion correction according to the third distortion correction quantity information is an example of third correction. The third correction is reverse correction that is the reverse of trapezoidal distortion correction performed by the distortion corrector 115.

The trapezoidal distortion corrector 120 performs the trapezoidal distortion correction according to the first distortion correction quantity information 103c on the output from the reverse corrector 119 (OSD image information on which third correction has been performed) to generate the first distortion corrected image information. The trapezoidal distortion correction according to the first distortion correction quantity information 103c is an example of the first correction.

The image combiner 114 combines the background image information and the first distortion corrected image information with each other to generate first combined image information in the illumination mode and combines the background image information and the OSD image information with each other to generate second combined image information.

The distortion corrector 115 is an example of a second distortion corrector. The distortion corrector 115 performs the trapezoidal distortion correction according to the second distortion correction quantity information 103d on the first combined image information to generate second distortion corrected image information in the illumination mode. The trapezoidal distortion correction according to the second distortion correction quantity information is an example of the second correction. The distortion corrector 115 performs the trapezoidal distortion correction according to the second distortion correction quantity information 103d on the second combined image information to generate third distortion corrected image information in the display mode.

The image controller 110 performs image processing on the distortion corrected image information (second distortion corrected image information and third distortion corrected image information) outputted by the distortion corrector 115 to produce a combined image signal. The projection section 105 projects an image according to the combined image signal produced by the image controller 110 on the projection surface 2.

The action of the projector 1A will next be described.

Figure 9:
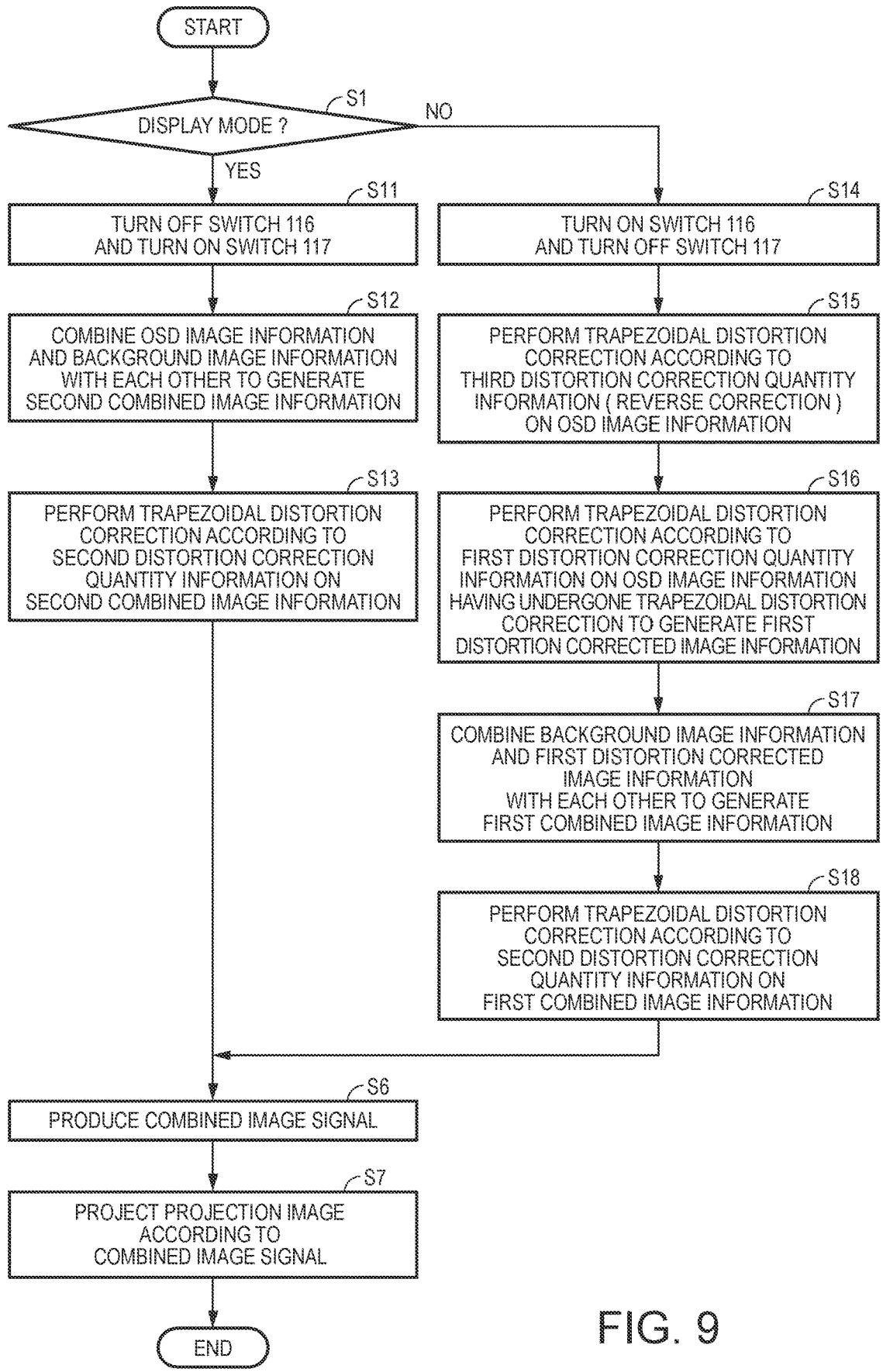
FIG. 9 is a flowchart for describing the action of the projector according to the second embodiment.

FIG. 9 is a flowchart for describing the action of the projector 1A. It is assumed in the following description that the first distortion correction quantity information 103c has been set in the trapezoidal distortion corrector 120, the second distortion correction quantity information 103d has been set in the distortion corrector 115, the third distortion correction quantity information has been set in the reverse corrector 119, and the OSD image generator 106 has generated the OSD image information.

In the case where the action mode information 103e indicates the display mode (YES in step S1), the correction controller 118 turns off the switch 116 and turns on the switch 117 (step S11). The OSD image information is therefore outputted from the OSD image generator 106 to the image combiner 114 via the switch 117.

The image combiner 114 combines the background image information and the OSD image information with each other to generate the second combined image information (step S12). The distortion corrector 115 subsequently performs the trapezoidal distortion correction according to the second distortion correction quantity information 103d on the second combined image information to generate the third distortion corrected image information (step S13). The image controller 110 subsequently performs image processing on the distortion corrected image information outputted by the distortion corrector 115 to produce a combined image signal (step S6). The projection section 105 subsequently projects an image according to the combined image signal produced by the image controller 110 on the projection surface 2 (step S7).

On the other hand, in the case where the action mode information 103e indicates the illumination mode (NO in step S1), the correction controller 118 turns on the switch 116 and turns off the switch 117 (step S14). The OSD image information is therefore outputted from the OSD image generator 106 to the reverse corrector 119 via the switch 116.

The reverse correction 119 performs the trapezoidal distortion correction according to the third distortion correction quantity information (reverse correction) on the OSD image information (step S15). The trapezoidal distortion corrector 120 then performs the trapezoidal distortion correction according to the first distortion correction quantity information 103c on the output from the reverse corrector 119 to generate the first distortion corrected image information (step S16). The image combiner 114 then combines the background image information and the first distortion corrected image information with each other to generate the first combined image information (step S17). The distortion corrector 115 then performs the trapezoidal distortion correction according to the second distortion correction quantity information 103d on the first combined image information to generate the second distortion corrected image information (step S18). Steps S6 and S7 are then carried out.

According to the present embodiment, different kinds of trapezoidal distortion correction can be performed on two images to be combined with each other (background image and OSD image). Therefore, even in the case where the projector 1A is used as an illumination apparatus, the projection target area can be illuminated while an OSD image having a small amount of distortion is displayed.

Variations

The invention is not limited to the embodiments described above, and a variety of variations, for example, those that will be described below, are conceivable. Further, one or more variations arbitrarily selected from the following aspects of variation can be combined with one another as appropriate.

Variation 1

In the embodiments, the distortion correction controller 111 and the correction controller 118 change the relationship between the trapezoidal distortion correction performed on an OSD image and the trapezoidal distortion correction performed on a background image (hereinafter referred to as "correction relationship") in accordance with the action mode.

The distortion correction controller 111 or the correction controller 118 may, however, change the correction relationship in accordance with a condition different from the action mode. For example, the distortion correction controller 111 or the correction controller 118 may change the correction relationship in accordance with the content of the background image (whether or not background image contains characters, for example). For example, the distortion correction controller 111 or the correction controller 118 may set the same correction relationship as that in the display mode in the case where the background image contains characters and may set the same correction relationship as that in the illumination mode in the case where the background image contains no characters. In this case, identification information representing whether or not a background image contains characters is added to the background image, and the distortion correction controller 111 or the correction controller 118 switches the action mode between the illumination mode and the display mode based on the identification information.

Variation 2

The entirety or part of the elements achieved when the processor 104 executes the program may be achieved by hardware formed, for example, of an FPGA (field programmable gate array), an ASIC (application specific IC), or any other electronic circuit or may be achieved by software and hardware that cooperate with each other.

Variation 3

The projection section 105 uses liquid crystal light valves as the light modulator, and the light modulator may not be formed of liquid crystal light valves and can be changed as appropriate. For example, a configuration using three reflective liquid crystal panels may be used as the light modulator. The light modulator may still instead, for example, be based on one liquid crystal panel, three digital mirror devices (DMDs), or one digital mirror device. In the case where only one liquid crystal panel or DMD is used as the light modulator, no members corresponding to the color separation system and the light combining system are required. Further, a configuration including no liquid crystal panel or DMD but capable of modulating light emitted from a light source can be employed as the light modulator.

What is claimed is:

1. A projector comprising:
a processor programmed to:
perform first trapezoidal correction that corrects trapezoidal distortion of an image on first image information to generate first corrected image information;
perform second trapezoidal correction that corrects trapezoidal distortion of an image on second image information to generate second corrected image information; and
combine the first corrected image information and the second corrected image information with each other to generate combined image information; and
a projection section configured to project an image according to the combined image information, wherein:
the projector is configured to operate in an illumination mode, in which the image projected by the projection section is single-color or simply patterned, and in a display mode;
the first trapezoidal correction is the same in the illumination mode and the display mode;
the second trapezoidal correction differs from the first trapezoidal correction in the illumination mode so that a portion of the projected image corresponding to the first corrected image information is not trapezoidally-distorted and a portion of the projected image corresponding to the second corrected image information is trapezoidally distorted; and
the second trapezoidal correction and the first trapezoidal correction are the same in the display mode.

2. A projector comprising:
a processor programmed to:
perform first trapezoidal correction and third trapezoidal correction that each correct trapezoidal distortion of an image on first image information to generate first distortion corrected image information;
combine second image information and the first distortion corrected image information with each other to generate first combined image information;
perform second trapezoidal correction that corrects trapezoidal distortion of an image on the first combined image information to generate second distortion corrected image information;
combine the first image information and the second image information with each other to generate second combined image information;
perform the second trapezoidal correction on the second combined image information to generate third distortion corrected image information; and
a projection section configured to project an image according to the second distortion corrected image information or the third distortion corrected image information, wherein:
the second trapezoidal correction differs from the first trapezoidal correction;
the third trapezoidal correction is reverse correction that is a reverse of the second trapezoidal correction;
the projector is configured to operate in an illumination mode, in which the image projected by the projection section is single-color or simply patterned, and in a display mode;
the processor is programmed to generate the first combined image information and the second distortion corrected image information in the illumination mode so that a portion of the projected image corresponding to the first image information is not trapezoidally-distorted and a portion of the projected image corresponding to the second image information is trapezoidally distorted; and
the processor is programmed to generate the second combined image information and the third distortion corrected image information in the display mode.

3. The projector according to claim 2,
wherein the projection section projects an image according to the second distortion corrected image information in the illumination mode and projects an image according to the third distortion corrected image information in the display mode.

4. A method for controlling a projector, the method comprising:
performing first trapezoidal correction that corrects trapezoidal distortion of an image on first image information to generate first corrected image information;
performing second trapezoidal correction that corrects trapezoidal distortion of an image on second image information to generate second corrected image information;
combining the first corrected image information and the second corrected image information with each other to generate combined image information; and
projecting an image according to the combined image information, wherein:
the projector is configured to operate in an illumination mode, in which the projected image is single-color or simply patterned, and in a display mode;
the first trapezoidal correction is the same in the illumination mode and the display mode;
the second trapezoidal correction differs from the first trapezoidal correction in the illumination mode so that a portion of the projected image corresponding to the first corrected image information is not trapezoidally-distorted and a portion of the projected image corresponding to the second corrected image information is trapezoidally distorted; and the second trapezoidal correction and the first trapezoidal correction are the same in the display mode.

5. A method for controlling a projector, the method comprising:

performing first trapezoidal correction and third trapezoidal correction that each correct trapezoidal distortion of an image on first image information to generate first distortion corrected image information;

combining second image information and the first distortion corrected image information with each other to generate first combined image information;

performing second trapezoidal correction that corrects trapezoidal distortion of an image on the first combined image information to generate second distortion corrected image information; and projecting an image according to the second distortion corrected image information, wherein:

the second trapezoidal correction differs from the first trapezoidal correction;

the third trapezoidal correction is reverse correction that is a reverse of the second trapezoidal correction;

the projector is configured to operate in an illumination mode, in which the projected image is single-color or simply patterned, and in a display mode;

the first combined image information and the second distortion corrected image information are generated in the illumination mode so that a portion of the projected image corresponding to the first image information is not trapezoidally-distorted and a portion of the projected image corresponding to the second image information is trapezoidally distorted; and in the display mode, a processor of the projector is programmed to (i) combine the first image information and the second image information with each other to generate second combined image information and (ii) perform the second trapezoidal correction on the second combined image information to generate third distortion corrected image information.

6. A projector comprising:

first and third correction means for performing first trapezoidal correction and third trapezoidal correction that each correct trapezoidal distortion of an image on first image information to generate first distortion corrected image information;

first combination means for combining second image information and the first distortion corrected image information with each other to generate first combined image information;

second correction means configured to perform second trapezoidal correction that corrects trapezoidal distortion of an image on the first combined image information to generate second distortion corrected image information; and projecting means for projecting an image according to the second distortion corrected image information, a portion of the projected image corresponding to the first image information being not trapezoidally-distorted and a portion of the projected image corresponding to the second image information being trapezoidally distorted, wherein the second trapezoidal correction differs from the first trapezoidal correction, and the third trapezoidal correction is reverse correction that is a reverse of the second trapezoidal correction.

7. The projector according to claim 6, further comprising:

second combination means for combining the first image information and the second image information with each other to generate second combined image information; and third correction means for performing the second trapezoidal correction on the second combined image information to generate third distortion corrected image information, wherein:

the projector is configured to operate in an illumination mode, in which the image projected by the projection section is single-color or simply patterned, and in a display mode;

the first combination means and the second correction means generate the first combined image information and the second distortion corrected image information in the illumination mode so that the portion of the projected image corresponding to the first image information is not trapezoidally-distorted and the portion of the projected image corresponding to the second image information is trapezoidally distorted; and the second combination means and the third correction means geneate the second combined image information and the third distortion corrected image information in the display mode.

* * * * *